(12) United States Patent
Meier

(10) Patent No.: US 6,587,071 B2
(45) Date of Patent: Jul. 1, 2003

(54) DEVICE FOR DETECTING OBJECTS IN THE AREA SURROUNDING A VEHICLE

(75) Inventor: Thomas Meier, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,564
(22) PCT Filed: May 10, 2001
(86) PCT No.: PCT/DE00/01461
§ 371 (c)(1), (2), (4) Date: Feb. 8, 2002
(87) PCT Pub. No.: WO00/68707
PCT Pub. Date: Nov. 16, 2000

(65) Prior Publication Data
US 2002/0158791 A1 Oct. 31, 2002

(30) Foreign Application Priority Data
May 11, 1999 (DE) .......................... 199 21 844

(51) Int. Cl.⁷ ............................................. G01S 13/93
(52) U.S. Cl. .............................. 342/70; 342/71; 342/72; 342/82; 342/85
(58) Field of Search ............................. 342/70, 71, 72, 342/82, 83, 84, 85, 88, 94, 95, 173, 174, 198

(56) References Cited

U.S. PATENT DOCUMENTS

| | | | |
|---|---|---|---|
| 4,003,051 A | * | 1/1977 | Fitzgerald et al. .......... 342/110 |
| 4,450,445 A | | 5/1984 | Conner ........................ 342/84 |
| 5,670,962 A | * | 9/1997 | Henderson et al. ........... 342/70 |
| 5,828,333 A | | 10/1998 | Richardson et al. .......... 342/70 |
| 5,910,786 A | * | 6/1999 | Watanabe .................... 342/70 |

FOREIGN PATENT DOCUMENTS

| | | |
|---|---|---|
| DE | 28 35 867 | 2/1980 |
| EP | 0 473 082 A | 3/1992 |
| EP | 0 758 093 A | 2/1997 |

* cited by examiner

*Primary Examiner*—John B. Sotomayor
(74) *Attorney, Agent, or Firm*—Michael J. Striker

(57) ABSTRACT

A device which can accurately detect even objects in very close proximity to a vehicle and at the same time can reliably detect more distant objects has means (MM) that can execute a selection of those reception pulses (EI) whose chronological offset in comparison to the respective transmission pulses (SI) emitted is of such a magnitude that these reception signals (EI) result exclusively from reflections against objects from a selected distance range correlating to the chronological offset. Means (DG) are also provided that permit the transmission pulse power to be increased and decreased as the distance range rises and falls.

10 Claims, 1 Drawing Sheet

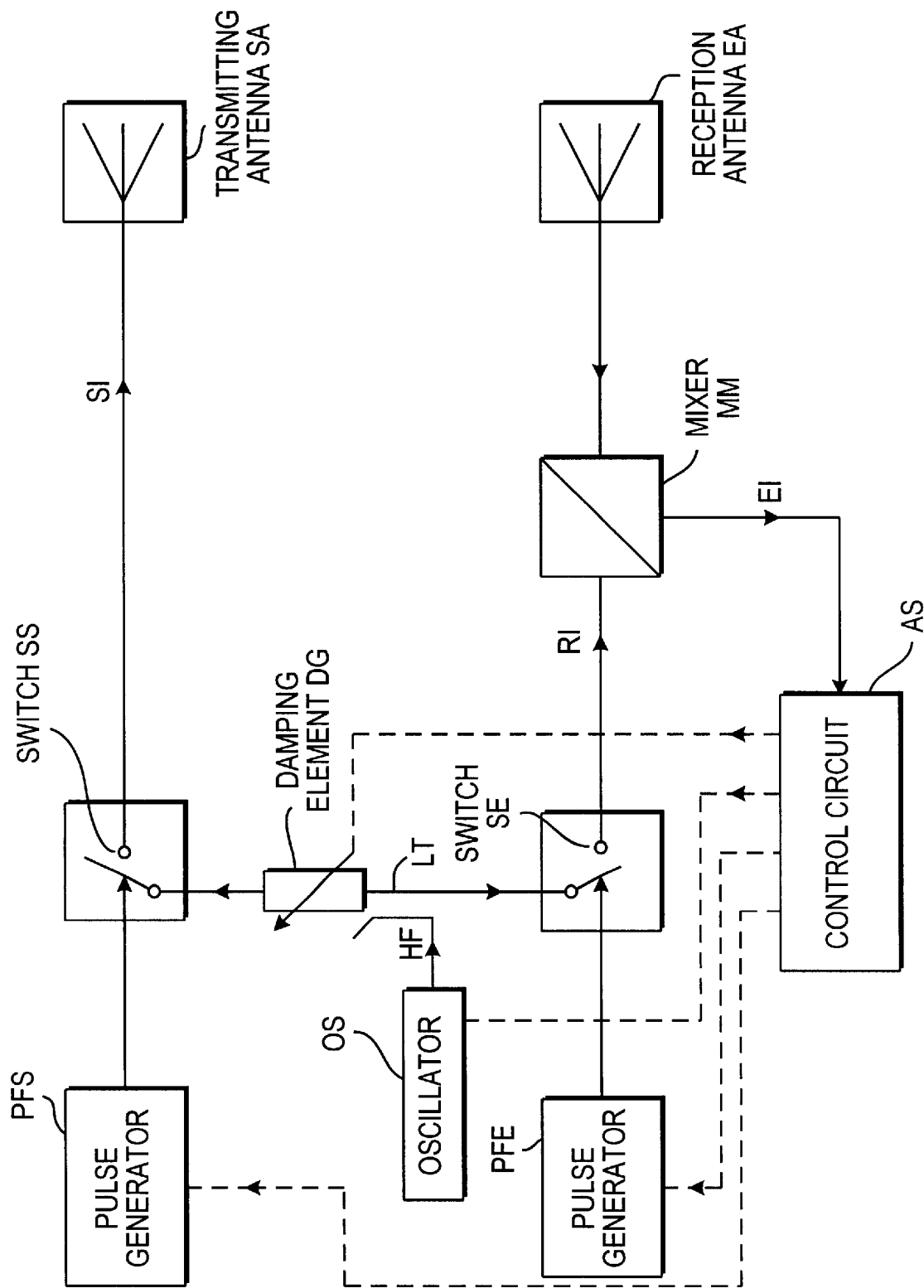

DEVICE FOR DETECTING OBJECTS IN THE AREA SURROUNDING A VEHICLE

PRIOR ART

The current invention relates to a device for detecting objects in the vicinity of a vehicle by means of pulse radar, which has a transmitter that emits transmission pulses, and a receiver that evaluates reception pulses reflected against objects. A device of this kind, which is based on the known pulse radar principal, has been disclosed, for example, by DE-OS 28 35 867.

A pulse radar device can be used to very precisely determine distances from objects and therefore a pulse radar-based device is suitable for use in vehicles, e.g. as a parking aid, as a pre-crash sensor, or for detecting objects in the vicinity of the so-called blind spot. In all of these applications, the immediate vicinity of a vehicle is monitored for the presence of collision obstacles in this range and the distance from the vehicle to these obstacles is measured. Radar sensors that monitor the immediate vicinity of the vehicle are referred to as short-range radar. Particularly with a short-range radar, there is the problem that the signals reflected against objects at a very short distance lead to an overmodulation in the receiver. In addition, an internal crosstalk from the transmission side to the reception side and a resulting interference voltage in the receiver cannot be prevented. This crosstalk results in the fact that it is hardly possible to detect objects in a very short distance range. Because the travel time of a wave reflected against a very close object approximately coincides with the travel time of crosstalking signals so that the reflected reception signal is overlapped by the crosstalk signal. The measurement of signals that are reflected against objects in close proximity is consequently distorted.

The object of the invention, therefore, is to disclose a device of the type mentioned at the beginning, which can accurately detect even objects in close proximity to the vehicle and can likewise reliably detect more distant objects.

ADVANTAGES OF THE INVENTION

The stated object is attained with the features of claim 1 by virtue of the fact that means are provided, which can execute a selection of those reception pulses whose chronological offset in comparison to the respective transmission pulses is of such a magnitude that these reception signals result exclusively from reflections against objects from a selected distance range correlating to the chronological offset and that additional means are provided, which permit the transmission pulse power to be increased and decreased as the distance range rises and falls. Namely, if the transmission pulse power for the detection of objects in very close proximity to the vehicle is kept at a low level, then reflected signals do not lead to an overmodulation of the receiver and also, the crosstalk between transmitter and receiver is weakened to such an extent that reception pulses reflected against close objects can be accurately detected. If the power of the transmission pulses is increased in order to detect objects in a greater distance range, then even reception signals reflected against small objects are still powerful enough to be detected in the receiver.

Advantageous improvements of the invention ensue from the dependent claims. The selection of reception pulses is preferably executed by means of a mixer which is contacted on the one hand by the reception pulses received by an antenna and on the other hand, is contacted by reference signal pulses, which in comparison to the transmission pulses, have a time delay that corresponds to the selected distance range.

For the production of transmission pulses and reference signal pulses, pulse generators can be provided, which execute a pulse modulation of a high frequency signal carrier supplied by an oscillator. A very simple pulse modulation of the high frequency signal carrier is preferably executed by means of an electrically controllable switch, which is respectively provided for the transmission pulses and for the reference signal pulses and which—controlled by the respective pulse generator—switches the high frequency signal carrier through to a transmission antenna or to the mixer.

It is advantageous to derive the high frequency signal carrier for the transmission pulses and the high frequency signal carrier for the reference signal pulses from a single oscillator by means of a power divider.

The means, which are for controlling the transmission pulse power, control the pulse amplitude and/or the pulse width. The pulse width can be controlled, for example, by changing the opening times of the switches. The pulse amplitude of the transmission pulses can be controlled by means of a variable damping element or by changing the operating point of the oscillator.

An improved signal-to-noise ratio of the reception pulses can be achieved by the receiver executing an integration of a number of reception signals originating from a respectively selected distance range.

DESCRIPTION OF AN EXEMPLARY EMBODIMENT

The invention will be explained in detail below in conjunction with an exemplary embodiment shown in the drawing.

The sole FIGURE of the drawing depicts a schematic circuit diagram of a pulse radar device of the kind that is installed in a vehicle to allow it to detect objects in its immediate vicinity. The pulse radar device has a transmission branch with a pulse generator PFS, a switch SS that can be controlled by it, and a transmitting antenna SA. The reception branch contains a mixer MM, a reception antenna EA, and a pulse generator PFE that controls a switch SE. Both of the switches SS and SE in the transmission branch and the reception branch are associated with a high frequency signal carrier HF. The high frequency signal carrier HF is the output signal of an oscillator OS, which is divided between the two switches SS and SE in the signal branch and in the reception branch by a power divider LT (e.g. a 3-dB coupler).

The high frequency signal carrier HF contacting the switch SS in the transmission branch thus undergoes a pulse amplitude modulation so that the pulses emitted by the pulse generator PFS close and open the switch SS with the rhythm of the pulses. This produces a pulse sequence of the high frequency signal carrier HF at the output of the switch SS, which sequence is emitted as transmission pulses via the transmission antenna SA.

The reception signal pulses reflected against objects in the vicinity of the vehicle are received by the reception antenna EA and supplied to a first input of a mixer MM. The second input of the mixer MM is also contacted by a pulse sequence of the high frequency signal carrier HF. This pulse sequence is produced because the switch SE in the reception branch, which is contacted by the high frequency signal carrier HF, is triggered by the pulse sequence of the pulse generator PFE. Reception pulses EI thus appear at the output of the mixer MM when there is chronological synchronicity between the reception pulses coming from the reception antenna EA and the reference pulses RI supplied by the switch SE. Consequently, through selection of the chronological position of the reference pulses RI, certain reception pulses EI coming from the reception antenna EA can be switched through to the output of the mixer MM. By presetting the chronological offset between the emitted transmission pulses SI and the reference pulses RI, reception pulses EI can now be selected whose travel times correspond to the chronological offset between the transmission pulses SI and the reference pulses RI. This means that certain distance ranges can be selected in which reception pulses EI reflected against objects are to be detected. It is therefore possible for there to be a distance-dependent detection of objects.

An evaluation circuit AS, which is supplied with the reception pulses EI that are present at the output of the mixer MM, controls the pulse generators PFS and PFE in the transmission and reception branches, as shown by the control lines depicted with dashed lines, in such a way that the chronological offset between the transmission pulses SI and the reference signal pulses RI increases from a low value to a higher value. As described above, the chronological offset between the transmission pulses SI and the reference signal pulses RI controls the distance range from which reception pulses EI reflected against objects in this range are detected. As the chronological offset between the transmission pulses SI and the reference signal pulses RI increases, the vicinity of the vehicle is thus scanned for objects, beginning at a very low distance range and moving to a greater distance range.

In short distance ranges, transmission pulses SI with excessive signal power cause the resulting reception pulses to overmodulate amplifiers contained in the receiver. Another problem arises as a result of internal crosstalk from the transmission branch to the reception branch. A crosstalk of this kind makes a detection of objects in close range (a distance of less than approx. 20 cm) almost impossible because the travel time of the waves reflected against nearby objects corresponds approximately to the travel time of waves crosstalking from the transmission branch to the reception branch. This undesirable effect results in reception pulses EI at the output of the mixer MM, which are significantly distorted, which makes it impossible to accurately detect close-range objects. In order to prevent this short-range interference from occurring, the power of the transmission pulses SI is reduced when close-range objects are being detected. However, if the distance range detected increases, then the power of the transmission pulses SI is increased so that even reception signals EI reflected against small objects in greater distance ranges can still be received with a sufficiently favorable signal-to-noise ratio. The evaluation circuit AS thus controls the transmission pulse power so that it begins with a low value at close ranges and rises with increasing distance ranges.

The transmission pulse power can be controlled by changing the pulse amplitude and/or the pulse width. In small distance ranges, it is suitable to emit transmission pulses SI with a narrow pulse width because this permits a higher spatial resolution, as is desirable with objects that are very close to one another. At greater distances, under some circumstances a high resolution in the detection of objects is not necessary so that in this case, the transmission pulse power can be increased by increasing the pulse width. The control circuit AS controls the pulse amplitude and the pulse width of the transmission pulses SI so that on the one hand, the transmission pulse power is increased and decreased as the distance range rises and falls, which takes into account the demand for a spatial resolution of the objects to be detected.

The control of the transmission pulse width takes place in the pulse generator PFS which, with a greater pulse width, triggers a longer opening time of the switch SS and with a narrower pulse width, triggers a shorter opening time of the switch SS. There are several possibilities for controlling the transmission pulse amplitude. For example, the operating point of the oscillator can be changed. Another possibility is comprised of inserting a variable damping element DG into the signal path of the high frequency signal carrier HF, whose damping is controlled by the control circuit AS.

The switches SS and SE are suitably embodied as transistor switches (FET transistors) so that the amplitude of the transmission pulses SI present at the output of the transistor can be controlled by means of controlling the bias voltage of the transistor in the transmission branch.

Intrinsically known methods, for example threshold evaluations or frequency evaluations, can be used to evaluate the reception pulses EI in the evaluation circuit AS. For the signal evaluation, it is useful to integrate several reception pulses EI from several measurement cycles in order to improve the signal-to-noise ratio. In addition, this permits a low-frequency signal evaluation.

What is claimed is:

1. A device for detecting objects in the vicinity of a vehicle by means of pulse radar, which has a transmitter that emits transmission pulses, and a receiver that evaluates reception pulses reflected against objects, characterized in that means (MM) are provided, which can execute a selection of those reception pulses (EI) whose chronological offset in comparison to the respective transmission pulses (SI) is of such a magnitude that these reception signals (EI) result exclusively from reflections against objects from a selected distance range correlating to the chronological offset and that additional means (DG) are provided, which permit the transmission pulse power to be increased and decreased as the distance range rises and falls.

2. The device according to claim 1, characterized in that the means for the selection of reception pulses (EI) preferably have a mixer (MM) which is contacted on the one hand by the reception pulses (EI) received by a reception antenna (EA) and on the other hand, is contacted by reference signal pulses (RI), which in comparison to the transmission pulses (SI), have a time delay that corresponds to the selected distance range.

3. The device according to claim 1, characterized in that for the production of transmission pulses (SI) and the reference signal pulses (RI), pulse generators (PFS, PFE) are provided, which execute a pulse modulation of a high frequency signal carrier (HF) supplied by an oscillator (OS).

4. The device according to claim 3, characterized in that the pulse modulation of the high frequency signal carrier (HF) is executed by means of an electrically controllable switch (SS, SE), which is respectively provided for the transmission pulses (SI) and for the reference signal pulses (RI) and which—controlled by the respective pulse generator (PFS, PFE)—switches the high frequency signal carrier (HF) through to a transmission antenna (SA) or to the mixer (MM).

5. The device according to claim 3, characterized in that a power divider (LT) is provided, which derives both the high frequency signal carrier (HF) for the transmission pulses (SI) and the high frequency signal carrier (HF) for the reference signal pulses (RI) from a single oscillator signal.

6. The device according to claim 1, characterized in that the means, which are for controlling the transmission pulse power, control the pulse amplitude and/or the pulse width.

7. The device according to claim 4, characterized in that the pulse width is controlled by changing the opening times of the switch (SS) in the transmission branch.

8. The device according to claim 6, characterized in that the pulse amplitude of the transmission pulses (SI) is controlled by means of a variable damping element (DG).

9. The device according to claim 3, characterized in that the pulse amplitude of the transmission pulses (SI) is controlled by changing the operating point of the oscillator (OS).

10. The device according to claim 1, characterized in that the receiver executes an integration of a number of reception signals (EI) originating from a respectively selected distance range.

* * * * *